(12) United States Patent
Trainin

(10) Patent No.: US 7,447,185 B2
(45) Date of Patent: Nov. 4, 2008

(54) TRANSMITTING AND PROTECTING LONG FRAMES IN A WIRELESS LOCAL AREA NETWORK

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 11/029,325

(22) Filed: Dec. 29, 2004

(65) Prior Publication Data

US 2006/0140172 A1 Jun. 29, 2006

(51) Int. Cl.
*H04Q 7/24* (2006.01)
(52) U.S. Cl. .................. 370/338; 370/331; 370/332; 370/333; 370/334; 370/445; 370/447; 370/389
(58) Field of Classification Search .......... 370/338, 370/331–334, 445, 447, 389, 387
See application file for complete search history.

(56) References Cited

U.S. PATENT DOCUMENTS

| 2002/0181425 | A1 | 12/2002 | Sherman | |
|---|---|---|---|---|
| 2003/0169769 | A1 | 9/2003 | Ho et al. | |
| 2003/0210673 | A1 | 11/2003 | Nishimura | |
| 2005/0053066 | A1* | 3/2005 | Famolari | 370/389 |
| 2005/0152359 | A1* | 7/2005 | Giesberts et al. | 370/389 |
| 2005/0232208 | A1* | 10/2005 | Hansen | 370/338 |
| 2005/0238016 | A1* | 10/2005 | Nishibayashi et al. | 370/389 |
| 2005/0286474 | A1* | 12/2005 | van Zelst et al. | 370/334 |
| 2005/0287978 | A1* | 12/2005 | Maltsev et al. | 455/403 |
| 2006/0109814 | A1* | 5/2006 | Kuzminskiy et al. | 370/329 |
| 2006/0268793 | A1* | 11/2006 | Zanaty | 370/338 |

FOREIGN PATENT DOCUMENTS

| WO | WO 2004/112324 A | 12/2004 |
|---|---|---|
| WO | WO 2005/112354 A1 | 11/2005 |

OTHER PUBLICATIONS

International Search Report and Written Opinion for PCT/US2005/046374 International Filing Date Dec. 19, 2005. Date Mailed Jun. 19, 2006.

Yang Xiao, "Concatenation and piggyback mechanisms for the IEEE 802.11 MAC" Wireless Communications and Networking Conference, 2004. WCNC. 2004 IEEE Atlanta, GA, USA Mar. 21-25, 2004, Piscataway NJ, USA IEEE, vol. 3, Mar. 21, 2004, pp. 1642-1647, XP010708040.

(Continued)

*Primary Examiner*—Rafael Pérez-Gutiérrez
*Assistant Examiner*—Nimesh Patel
(74) *Attorney, Agent, or Firm*—Pearl Cohen Zedek Latzer, LLP

(57) ABSTRACT

Methods and systems for communicating in a wireless network may use long frames each including an aggregation of medium access control (MAC) protocol data units (MPDUs). In certain embodiments, the first MPDU of a frame may be composed in a format compatible with legacy wireless local area network devices designed to read frames having only one MPDU. A field in the first MPDU may include a duration value which may be used to update a Network Allocation Vector (NAV) of the legacy device to refrain from transmitting for the duration of the long frame. Various other embodiments and implementations are also disclosed.

19 Claims, 3 Drawing Sheets

OTHER PUBLICATIONS

Yang Xiao, "Packing Mechanisms for the IEEE 802.11n wireless LANs" Global Telecommunications Conference, 2004. Globecom '04. IEEE Dallas, TX, USA Nov. 29-Dec. 3, 2004, Piscataway NJ, USA IEEE, Nov. 29, 2004 pp. 3275-3279, XP010758325.

Syed Aon Mujtaba, "Technical Specification for MAC and the PHY layer of the TGn Sync proposal to IEEE 802.11 TGn" IEEE P802.11 Wireless LANS, May 2005, pp. 1-134, XP002340381.

* cited by examiner

TRANSMITTING AND PROTECTING LONG FRAMES IN A WIRELESS LOCAL AREA NETWORK

BACKGROUND

In today's communications industry rapid advances in communication protocols and techniques are common. To facilitate widespread deployment of new systems, significant efforts are often made to ensure new communications techniques and systems are compatible with previous systems and devices, referred to herein as "legacy" systems or devices.

Throughput above the Medium Access Control (MAC) level is a key parameter of wireless local area networks (WLANs). One way to get more throughput is to use longer frames in the air link that decreases overhead of headers and inter frame pauses. Such a long frame could be built as concatenation (or aggregation) of MAC level Protocol Data Units (MPDUs) and sent as a single Physical Protocol Data Unit (PPDU). However in legacy WLANs only one MPDU per PPDU is allowed.

Longer frames proposed for newer generation systems may cause problems for interoperability with legacy systems as techniques typically used for avoiding collisions in legacy systems may not be designed to accommodate the longer frame transmissions of newer generation systems.

Accordingly, a system which provides longer frame capability and reduces frame collisions would be desirable.

BRIEF DESCRIPTION OF THE DRAWING

Aspects, features and advantages of the embodiments of the present invention will become apparent from the following description of the invention in reference to the appended drawing in which like numerals denote like elements and in which.

DETAILED DESCRIPTION OF THE INVENTION

Figure 1:
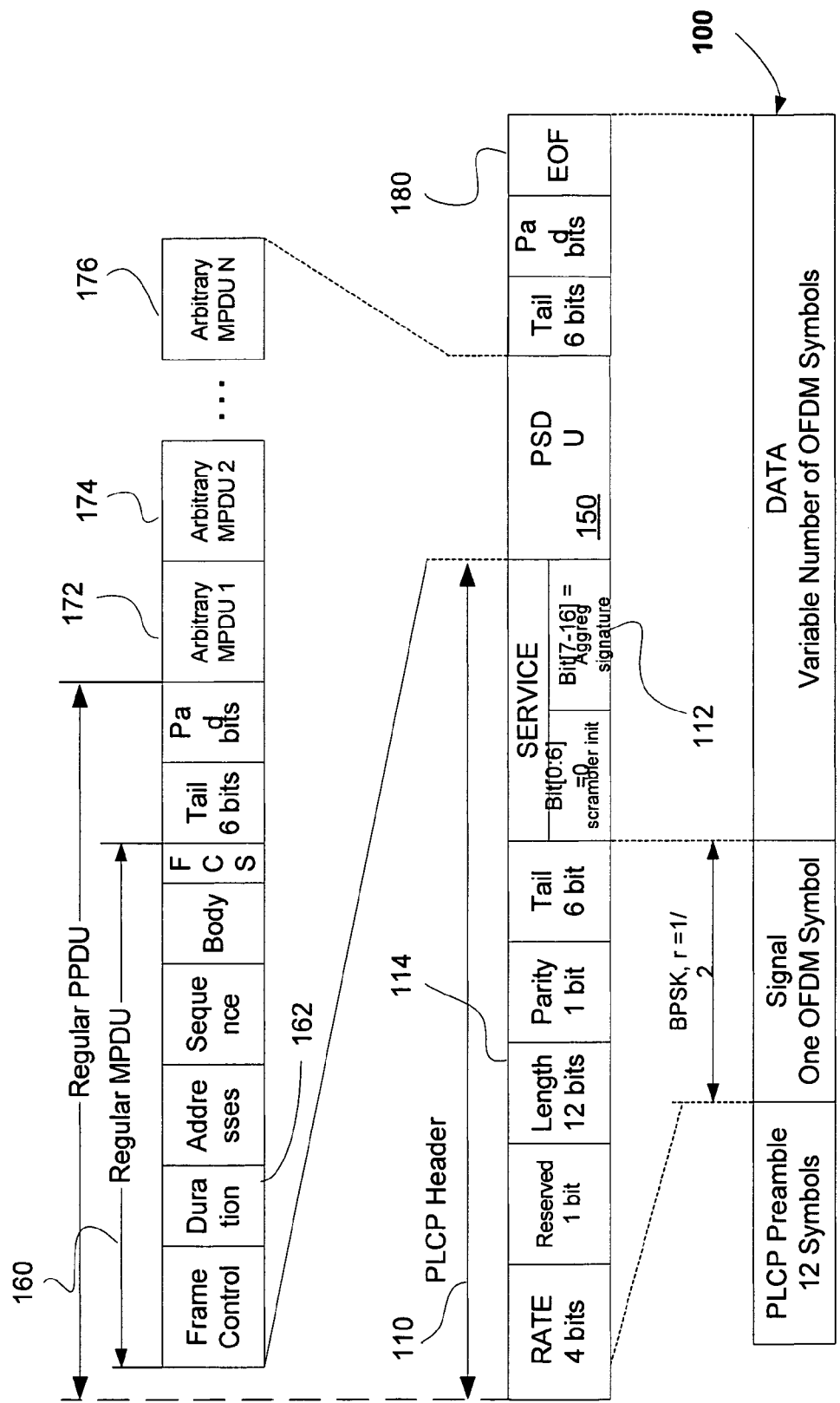
FIG. 1 is a block diagram showing an example frame structure for use in wireless networks according to one embodiment of the present invention.

While the following detailed description may describe example embodiments of the present invention in relation to wireless local area networks (WLANs), the invention is not limited thereto and can be applied to other types of wireless or wired networks where advantages could be obtained. Such networks include, but are not limited to, those associated with wireless wide area networks (WWANs) such as general packet radio service (GPRS), enhanced GPRS (EGPRS), wideband code division multiple access (WCDMA), code division multiple access (CDMA) and CDMA 2000 systems or other similar systems, wireless metropolitan area networks (WMANs), such as wireless broadband access systems including those supported by the Wordwide Interoperatiblity for Microwave Access (WiMAX) Forum, wireless personal area networks (WPANs) and the like.

The following inventive embodiments may be used in a variety of applications including transmitters, receivers and/or transceivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and radiotelephones. Further, the radio systems within the scope of the inventive embodiments may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

The following inventive embodiments are described in context of example WLANs using orthogonal frequency division multiplexing (OFDM) although the invention is not limited in this respect.

The Institute of Electrical and Electronics Engineers (IEEE) finalized an initial standard for WLANs known at IEEE 802.11 (1999). This standard specifies a 2.4 GHz operating frequency with data rates of 1 and 2 Mbps using either direct sequence or frequency hopping spread spectrum. The IEEE 802.11 working group has since published three supplements to the 802.11 standard: 802.11a (OFDM in 5.8 GHz band) (ISO/IEC 8802-11: 1999), 802.11b (direct sequence in the 2.4 GHz band) (1999 and 1999 Cor.-1/2001), and 802.11g (OFDM in the 2.4 GHz band) (2003). These systems, most notably 802.11a and 802.11g utilizing OFDM, are individually or collectively referred to herein as "legacy" WLANs.

The IEEE 802.11a standard specifies an OFDM physical layer that splits an information signal across 52 separate sub-carriers to provide transmission of data. The primary purpose of the OFDM Physical Layer is to transmit MAC (medium access control) protocol data units (MPDUs) as directed by the 802.11 MAC Layer. The OFDM Physical Layer is divided into two elements: the PLCP (physical layer convergence protocol) and the PMD (physical medium dependent) sublayers. The PLCP sublayer prepares MAC protocol data units (MPDUs) for transmission and delivers incoming frames from the wireless medium to the MAC Layer. The PLCP sublayer minimizes the dependence of the MAC layer on the PMD sublayer by mapping MPDUs into a frame format suitable for transmission by the PMD. As mentioned previously, for legacy systems such as IEEE 802.11a, only one MPDU is allowed per PPDU.

However, recent proposals for new generation high throughput (HT) WLANs, such as those contemplated for adoption in the IEEE 802.11n standard; define a PPDU frame which includes an aggregation of MPDUs in a single frame. The problem with using longer frames is that interoperability issues may arise in WLANs having both existent (i.e., legacy) devices and newer generation HT devices.

WLAN that uses any type of Carrier Sense Media Access (CSMA) cannot entirely avoid collisions. Collisions happen when two or more stations start to transmit simultaneously or when some stations start transmitting before other stations have completed transmitting. Frames that have suffered collisions cannot be received properly and should be resubmitted, which reduces WLAN throughput. Thus it follows that if frames are made longer, reducing collisions becomes even more significant, in order to preserve higher throughput.

A MAC mechanism called virtual carrier sense is sometimes used to avoid collisions that happen if multiple stations start to transmit at the same time. This mechanism propagates to other stations duration information for the time interval that the current station plans to use for its own transmission. As a condition to accessing the medium, the MAC Layer checks the value of its network allocation vector (NAV), which is a counter resident at each station that may represent the amount of time that remains on a shared channel that may be transmitted by over station. The NAV must be zero before a station can attempt to send a frame. During transmitting of a current frame, a station calculates the amount of time necessary to send the next frame or sequence of frames based on those frames' length and data rate. The station places a value representing this time in the duration field in the header of the current frame. When stations receive the frame, they examine this duration field value and use it as the basis for setting their corresponding NAVs. This process essentially reserves a time allocation of the shared channel for the sending station to transmit.

Virtual carrier sense may use collision avoidance technique implementing request-to-send (RTS) and clear to send (CTS) messaging between transmitting and receiving stations and in which peers stations may extract values from RTS/CTS messages for updating NAVs. However, with the "hidden node" problem, where for example one peer does not receive the CTS (due to its geographic position or link obstructions) peer stations NAVs may not always be accurately updated, which may result in overlapping transmissions and thus collisions.

A physical (PHY) layer mechanism in the PLCP header of a PPDU frame includes a field that identifies the size and rate that together indicates duration of the frame. Therefore, other stations may know the duration of a current frame on air and defer their own transmissions until the frame duration has ended. However, since legacy WLAN systems are built to support only one MPDU per PPDU, the existent PLCP header for legacy WLAN PPDU frames is not designed to contain a number large enough to describe the duration of the longer PPDU frames proposed for new generation WLANs.

Turning to FIG. 1, a PPDU frame structure 100 which may address one or more of the aforementioned issues will now be described. In various embodiments, the payload (shown in FIG. 1 as the PHY Service Data Unit (PSDU) 150) of frame 100 may be composed of a number of MPDUs 160, 172, 174, 176. The first MPDU 160 is constructed to have a legacy format (where any reserved frame type is supported) and the remaining MPDUs (e.g., 172, 174, 176) of payload 150 may be of any format.

In one embodiment, the orthogonal frequency division multiplexing (OFDM) PLCP header may be configured to use a reserved field 112 for indicating that PPDU frame 100 is an aggregated (or long) frame.

The length field 114 of PLCP header 110 may be set to a value to identify a byte count of only the first MPDU 160 of the multi-MPDU frame payload 150, as opposed to the length of the entire frame structure. In this manner, a legacy device may be able to read the first MPDU 160 of frame 100 even though the remainder of the MPDUs 172, 174, 176 are irrelevant to a legacy device. Signaling may be included for identifying the end of frame (EOF), e.g, field 180, on the PHY level since the length field 114 of header 110 would not correctly identify the length of frame 100.

Further, in accordance with various embodiments, the NAV value in the duration field 162 of the first MPDU 160 may be set to identify the remaining duration of the aggregated frame 100—total duration of MPDUs 172, 174, 176.

Accordingly, the aggregated frame 100 may be used to communicate between new generation HT WLAN devices and each HT WLAN device may identify the aggregated frame 100, for example based on the reserve bits in Service field 112. The HT WLAN devices may thus not take into account the value in length field 114 in PLCP header 110 but rather process the frame until the EOF signaling 180 is encountered.

Legacy stations may use information the long frame 100 to update its NAV mechanisms to that their own transmissions are deferred until the end of the aggregated frame. For example, the PHY of a legacy station may collect and supply to the MAC, only the part mentioned in the length field 112 of PLCP header 110 (e.g., only the first MPDU). Since the first MPDU 160 is of a legacy format, the legacy station MAC is able to process it and extract the NAV value from duration field 162. Consequently, the NAV mechanism of a legacy station may be updated accurately for long frames even though the legacy station may not be able to understand the entirety of aggregated frame 100.

FIG. 1 also shows example OFDM symbol generation for the PHY layer which may be used for implementing the aggregated frame, although the inventive embodiments are not limited in this respect.

Figure 2:
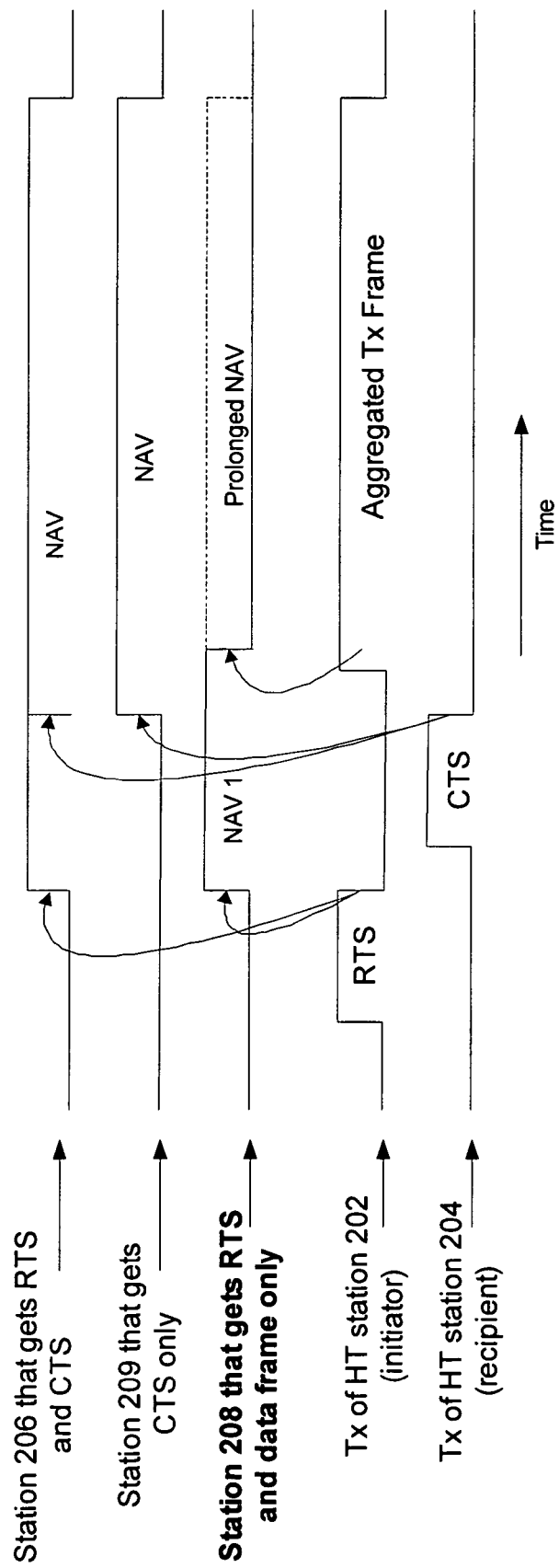
FIG. 2 is an example timing diagram for transmission of long frames and contention prevention periods of peer stations for avoiding collisions in a wireless network.

Turning to FIG. 2, the format for aggregated frame 100 may also be useful for collision protection under the RTS/CTS approach. As shown in this example, when an HT station 202 wants to transmit, it may issue a RTS message with a duration value asserted to protect the duration sequence of the expected CTS and aggregated frame. At this point any station, including legacy devices, that heard the RTS may have updated NAVs to refrain from transmitting for duration of $NAV_t$ period of time (shown for example, by the station 208). This NAV actually covers the CTS and beginning of the aggregated frame.

The intended recipient HT device 204, such as an Access Point (AP), mesh node or other station, may then issue a CTS message that contains a duration value long enough to protect the entire aggregated frame which will be sent by the transmitting HT station 202. All stations that get hear the CTS, e.g., stations 206 and 209, may assert NAV for the duration of the long frame. With the proposed long frame structure (e.g., 100) of the inventive embodiments, those stations that heard RTS but not succeeding getting NAV values from CTS (e.g., station 208) may prolong its NAV (and thus its no transmit period) to cover the entire aggregated frame based on values in the transmitted frame itself (e.g., duration value in field 162 of the first MPDU; FIG. 1). This prolonged no transmit period is shown as a dashed line for station 208 of FIG. 2.

As can be observed, with implementation of the foregoing embodiments, improved HT WLAN performance can be achieved using long frames even in a mixed environment that includes both legacy and HT stations. Further, the need for RTS/CTS protection of aggregated frames may be reduced and thus the overhead associated with RTS/CTS may be reduced, which may increase throughput even further. Lastly, the inventive embodiments may improve the performance of networks using RTS/CTS when, for example, hidden node problems are encountered.

Figure 3:
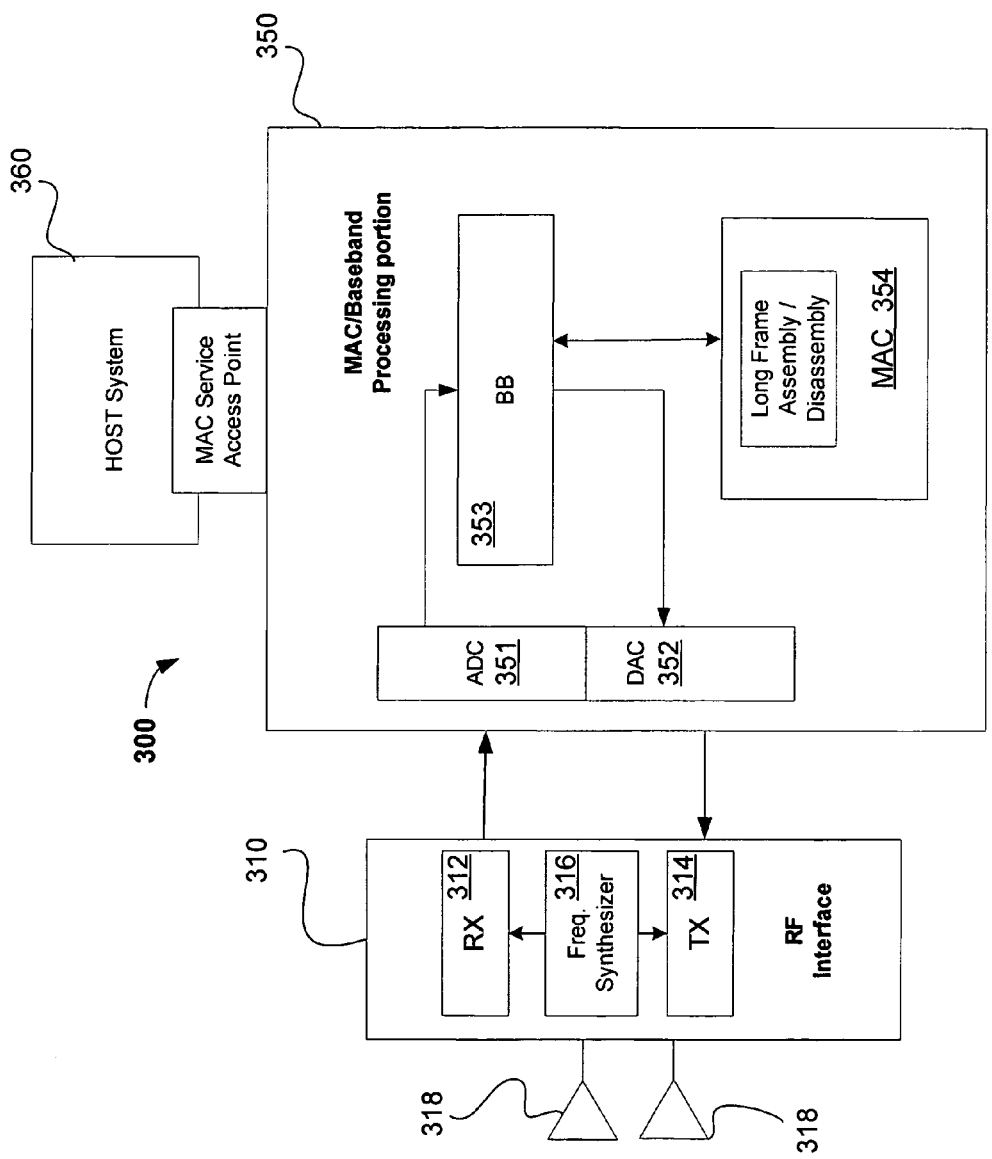
FIG. 3 is a functional block diagram of an example embodiment for a wireless apparatus for sending and receiving long frames in accordance with various aspects of the present invention.

Turning to FIG. 3, an example apparatus 300 for use in a wireless network may include a Host System 360, a processing circuit 350 which may be any component or combination of components and/or machine readable code adapted to produce long frames as described herein. In one example implementation, circuit 350 may include a baseband processing circuit 353, a medium access controller circuit 354 and a radio frequency (RF) interface 310 if desired. MAC may assemble MPDUs getting MSDUs from HOST 360 and may insert a dummy MPDUs at the beginning of each aggregated frame including a duration value for the aggregate frame as described above. Base band processing circuit 353 appends the related PLCP header 110 and EOF 180

MAC and Base Band circuit 350 and/or RF interface 310 may include any hardware, software and/or firmware components necessary for MAC layer processing, PHY link layer processing and/or RF processing for sending and/or receiving long frames as described previously.

Apparatus 300 may be a wireless mobile station such as a cell phone, personal digital assistant, computer, personal entertainment device, wireless router, a network access station such as a WLAN access point (AP), a mesh node or other equipment and/or network adaptor therefore. Accordingly, the functions and/or specific configurations of apparatus 300 could be varied as suitably desired.

The components and features of apparatus 300 may be implemented using any combination of discrete circuitry, application specific integrated circuits (ASICs), logic gates and/or single chip architectures. Further, the features of apparatus 300 may be implemented using microcontrollers, programmable logic arrays and/or microprocessors or any combination of the foregoing where suitably appropriate.

It should be appreciated that apparatus 300 shown in the block diagram of FIG. 3 is only one functionally descriptive example of many potential implementations. Accordingly, division, omission or inclusion of block functions depicted in the accompanying figures does not infer that the hardware components, circuits, software and/or elements for implementing these functions would necessarily be combined, divided, omitted, or included in embodiments of the present invention.

Embodiments of apparatus 300 may be implemented using single input single output (SISO) systems. However, certain alternative implementations may use multiple input multiple output (MIMO) architectures having multiple antennas 318, 319.

Unless contrary to physical possibility, the inventors envision the methods described herein may be performed in any sequence and/or in any combination; and the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method of communicating in a wireless network, the method comprising:
   transmitting an aggregate frame composed of a plurality of medium access control (MAC) Protocol Data Units (MPDUs) wherein the aggregate frame includes a physical layer convergence procedure (PLCP) header including a length field including only a length of a first MPDU of the aggregate frame, said first MPDU has a format readable by a legacy wireless local area network (WLAN) device which can only read frames having a single MPDU.

2. The method of claim 1 wherein the first MPDU has a format in conformance with an Institute of Electrical and Electronics Engineers (IEEE) 802.11 format.

3. The method of claim 1 wherein the aggregate frame includes a physical layer convergence procedure (PLCP) has a format substantially in conformance with an Institute of Electrical and Electronics Engineers (IEEE) 802.11a format.

4. The method of claim 1 wherein the first MPDU includes a duration value identifying a duration of the aggregate frame.

5. The method of claim 1 wherein the aggregate frame further comprises an end of frame (EOF) indicator.

6. The method of claim 1 further comprising, before transmitting:
   inserting the first MPDU as a MPDU containing a duration value for the legacy WLAN device to update its network allocation vector (NAV) for a duration of the aggregate frame.

7. An apparatus for use in a wireless network, the apparatus comprising:
   a processing circuit to form a frame comprising a plurality of MAC protocol data units (MPDUs) wherein the frame includes a physical layer convergence procedure (PLCP) header including a length field including only a length of a first MPDU of the frame, said first MPDU includes a duration value identifying a duration of the frame.

8. The apparatus of claim 7 wherein the processing circuit comprises a baseband processing circuit and a MAC circuit communicatively coupled to the baseband processing circuit.

9. The apparatus of claim 7 wherein the processing circuit is configured to modulate the frame using orthogonal frequency division multiplexing (OFDM).

10. The apparatus of claim 7 further comprising a radio frequency (RF) interface coupled to the processing circuit, the RF interface including at least two antennas for multiple input multiple output (MIMO) operation.

11. The apparatus of claim 7 wherein the apparatus comprises at least a portion of a mobile station or a network access station.

12. The apparatus of claim 7 wherein the duration value is provided to update a network allocation vector (NAV) of a legacy device which may not comprehend the entire frame.

13. The apparatus of claim 7 wherein the first MPDU of the frame is transmitted at a different rate than other MPDUs of the aggregated frame.

14. The apparatus of claim 7 wherein the header further includes a bit to identify the frame as an aggregated frame.

15. The apparatus of claim 7 wherein the frame further comprises an end of frame (EOF) indicator.

16. A system for use in a wireless network, the system comprising:
   a processing circuit to generate frames, each frame comprising a header and a plurality of medium access control (MAC) Protocol Data Units (MPDUs), wherein the header of each frame includes a length field including only a length of a first MPDU of the frame;
   a radio frequency (RF) interface communicatively coupled with the processing circuit; and
   at least two dipole antennas coupled with the RF interface for multiple input multiple output (MIMO) communications.

17. The system of claim 16 wherein the system comprises at least part of either a mobile station or a network access station.

18. The system of claim 16 wherein the wireless network comprises a wireless local area network (WLAN).

19. The system of claim 16 wherein the first MPDU of each frame has a structure substantially in conformance with an Institute of Electrical and Electronics Engineers (IEEE) 802.11a format.

* * * * *